(12) United States Patent
Xu et al.

(10) Patent No.: US 9,065,377 B2
(45) Date of Patent: Jun. 23, 2015

(54) LOAD COMMUTATED INVERTER DRIVE SYSTEMS FOR HIGH POWER DRIVE APPLICATIONS

(71) Applicant: General Electric Company, Schenectady, NY (US)

(72) Inventors: Chunchun Xu, Pittsburgh, PA (US); Allen Michael Ritter, Salem, VA (US); Cyrus David Harbourt, Salem, VA (US); Luis Jose Garces, Niskayuna, NY (US); Cheng Luo, Pittsburgh, PA (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 13/838,925

(22) Filed: Mar. 15, 2013

(65) Prior Publication Data

US 2014/0265972 A1 Sep. 18, 2014

(51) Int. Cl.
| | |
|---|---|
| *H03K 5/00* | (2006.01) |
| *H02P 1/30* | (2006.01) |
| *H02P 27/04* | (2006.01) |
| *H02M 7/521* | (2006.01) |
| *H02P 27/06* | (2006.01) |

(52) U.S. Cl.
 CPC ........................................ *H02P 27/06* (2013.01)

(58) Field of Classification Search
 USPC .................................. 323/215, 247, 305, 355
 See application file for complete search history.

(56) References Cited

U.S. PATENT DOCUMENTS

| | | | | |
|---|---|---|---|---|
| 4,449,087 | A * | 5/1984 | Lippitt et al. | 318/723 |
| 4,607,206 | A * | 8/1986 | Sember et al. | 318/798 |
| 4,814,964 | A * | 3/1989 | Schauder et al. | 363/37 |
| 4,849,870 | A * | 7/1989 | Heinrich | 363/37 |
| 5,446,643 | A * | 8/1995 | McMurray | 363/40 |
| 5,751,138 | A * | 5/1998 | Venkata et al. | 323/207 |
| 5,905,367 | A * | 5/1999 | Hochgraf | 323/210 |
| 6,340,851 | B1 * | 1/2002 | Rinaldi et al. | 307/82 |
| 8,264,191 | B1 * | 9/2012 | Ranganathan et al. | 318/767 |
| 2009/0058351 | A1 * | 3/2009 | Messersmith et al. | 318/809 |
| 2010/0164302 | A1 * | 7/2010 | Beck | 307/151 |
| 2013/0107587 | A1 * | 5/2013 | Xu et al. | 363/37 |

* cited by examiner

*Primary Examiner* — Paul Ip
*Assistant Examiner* — Devon Joseph
(74) *Attorney, Agent, or Firm* — Sutherland Asbill & Brennan LLP

(57) ABSTRACT

A load commutated inverter (LCI) drive system for a synchronous electrical machine is provided. The system may include a first supply bridge and a second supply bridge, each of which may include an alternating current to direct current (AC-to-DC) source side converter, a DC link circuit, and a DC-to-AC load side inverter. The system may include a controller for selectively controlling at least one of the first supply bridge and the second supply bridge by selective firings of silicon controlled rectifiers (SCRs). The electrical power outputted from the first supply bridge and the second supply bridge may be combined by an output delta-wye electric power transformer and supplied to the electrical machine. The LCI drive system may further include one or more input electric power transformers configured to supply an input electric power to the first supply bridge and the second supply bridge.

17 Claims, 10 Drawing Sheets

700

800

900

US 9,065,377 B2

LOAD COMMUTATED INVERTER DRIVE SYSTEMS FOR HIGH POWER DRIVE APPLICATIONS

TECHNICAL FIELD

Embodiments of this disclosure relate generally to load commutated inverter (LCI) drive systems for high power electrical machines and, more specifically, to systems for combining voltages of more than one serially connected LCI through a delta-wye transformer.

BACKGROUND

LCI drive systems are conventionally used for operating various electrical machines such as heavy duty turbomachines, electrical motors, compressors, pumps, and so forth. Conventionally, a LCI provides a current source to an electrical machine through the use of silicon controlled rectifiers (SCRs) which transform, based on the current operation of the electrical machine, direct current (DC) to multiphase alternating current (AC) for supplying the AC to the electrical machine. LCI drive systems are designed for operating electrical machines in both starting operation mode, also known as a force commutated mode, and a "normal" operation mode, also known as a self commutated mode. Variable frequency AC power allows starting electrical machines without auxiliary equipment.

Typically, LCI drive systems are designed for specific synchronous electrical machines and, especially, for those machines performing heavy duty tasks. Such drive systems have high power ratings and involve utilizing high operating voltages. To decrease the operating voltages, conventional systems use at least six or nine phase synchronous electrical motors, with each of three phases coupled to a separate lower power LCI drive. Such systems are very complex in nature because multiple LCI drives need a complex controlling scheme, synchronizing scheme, complex wiring, the need to use bypass switching to allow for operating at low frequencies, and so forth.

BRIEF DESCRIPTION OF THE DISCLOSURE

According to one example embodiment of the disclosure, a LCI drive system for an electrical machine may be provided. The system may include a first supply bridge and a second supply bridge, each of which may include an AC-to-DC source side converter, a DC link circuit, and a DC-to-AC load side inverter. The system may include a controller for selectively controlling at least one of the first supply bridge and the second supply bridge by selective firings of SCRs. The electrical power outputted from the first supply bridge and the second supply bridge may be selectively supplied by an output delta-wye electric power transformer combining voltage for the electrical machine. The system may further include one or more input electric power transformers configured to supply an input electric power to the first supply bridge and the second supply bridge.

In certain embodiments of the disclosure, the input electric power transformers may include an input 3-winding wye/wye, delta electric power transformer. Furthermore, in certain embodiments of the disclosure, the first AC-to-DC source side converter and the second AC-to-DC source side converter may include two series-connected rectifier switch units configured to convert the input electric power. In certain embodiments of the disclosure, the DC-to-AC load side inverter of one supply bridge may be operatively coupled to wye windings of the output delta-wye electric power transformer, while the DC-to-AC load side inverter of another supply bridge may be coupled to delta windings of the output delta-wye electric power transformer. The electrical machine may be coupled to wye windings of the output delta-wye electric power transformer.

In certain embodiments of the disclosure, the controller may be configured to selectively cause a phase shift (e.g., 30 degrees) of respective alternating currents flowing via the DC-to-AC load side inverters to compensate for the output transformer phase difference between Delta and Wye windings.

Additional systems, methods, apparatuses, features, and aspects are realized through the techniques of various embodiments of the disclosure. Other embodiments and aspects of the disclosure are described in detail herein and are considered a part of the claimed disclosure. Other embodiments and aspects can be understood with reference to the description and the drawings.

BRIEF DESCRIPTION OF THE DRAWINGS

Figure 1:
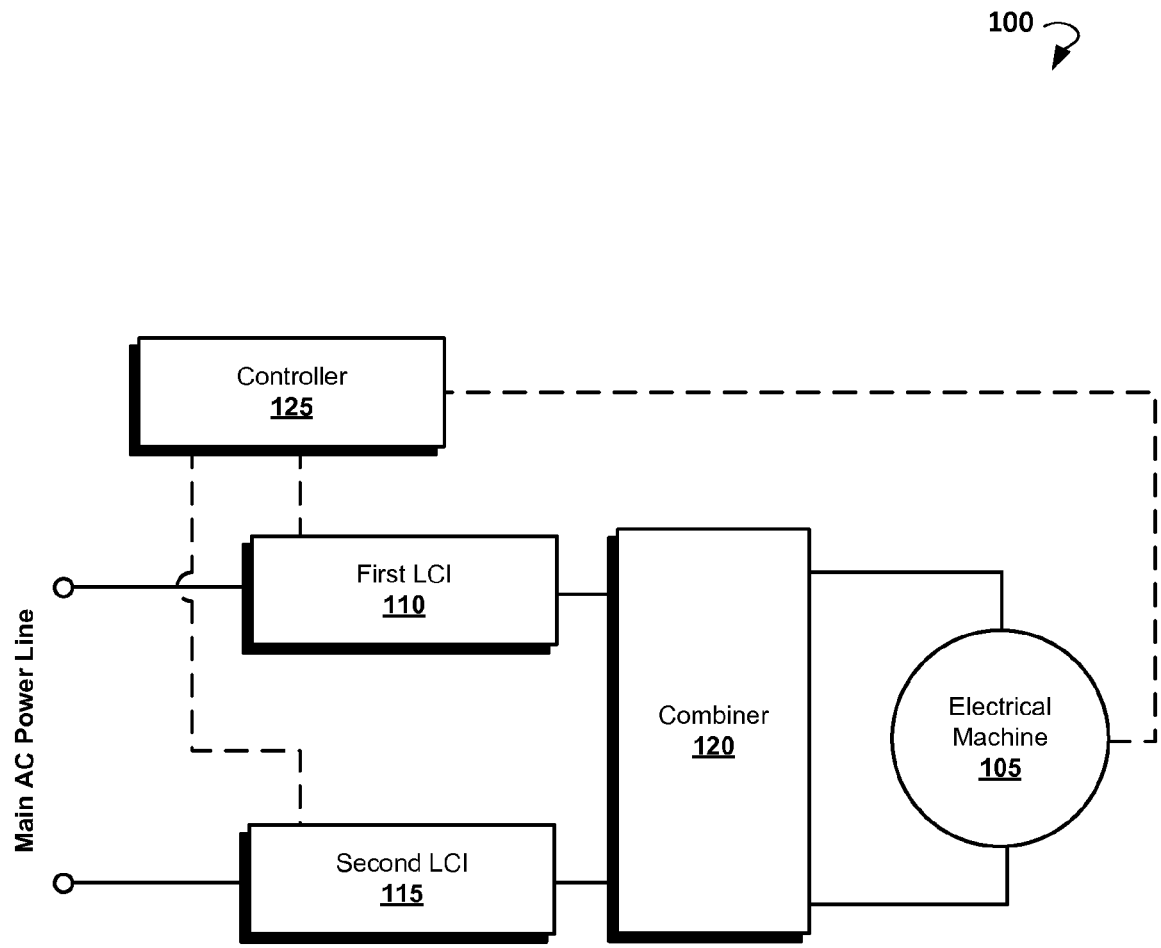

Having thus described the disclosure in general terms, reference will now be made to the accompanying drawings, which are not necessarily drawn to scale, and wherein:

FIG. 1 shows a high level block diagram of a LCI drive system for powering an electrical synchronous machine, according to example embodiments of the disclosure.

Figure 2:
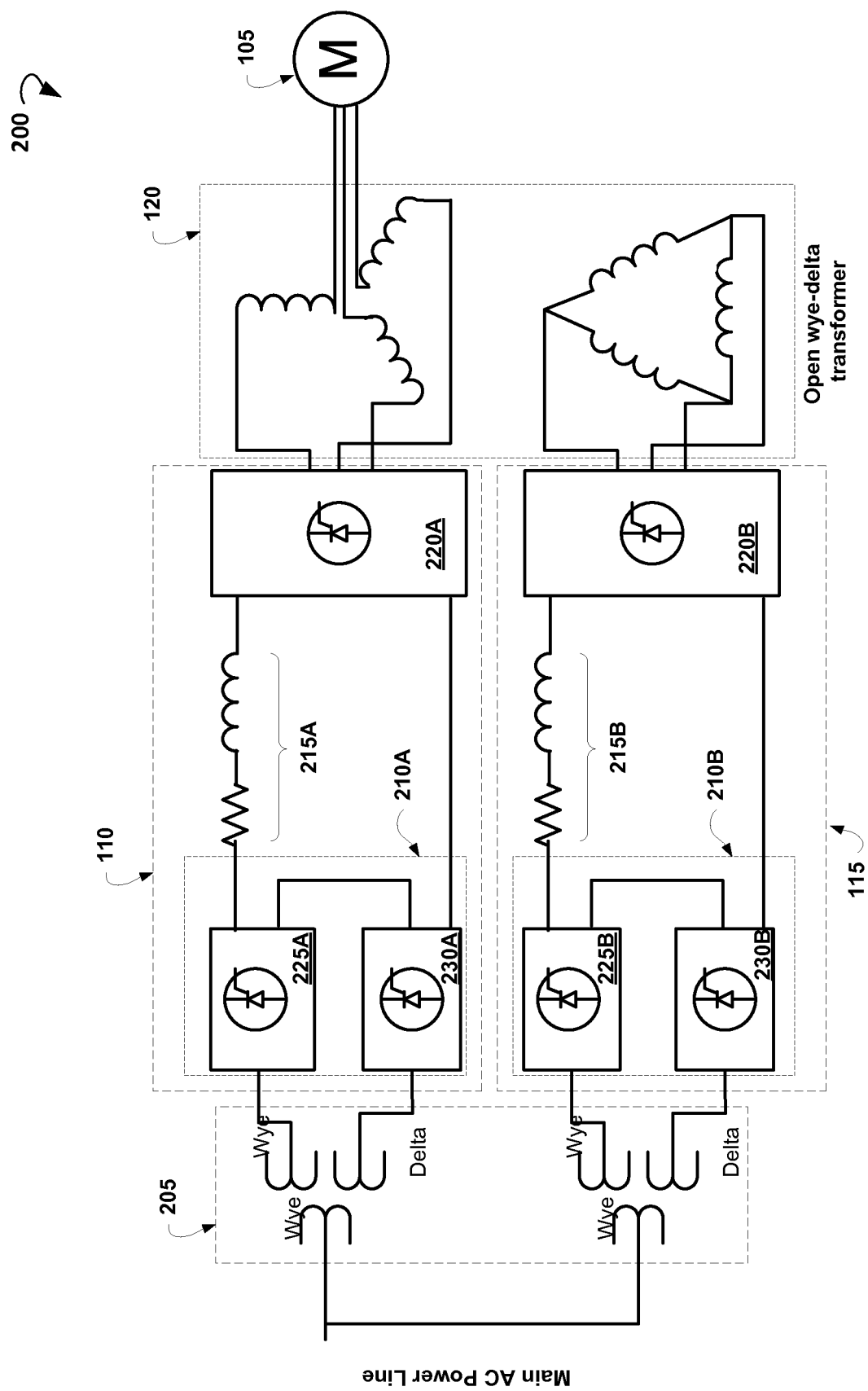

FIG. 2 shows a topology of a LCI drive system for driving a three-phase electrical synchronous machine, according to example embodiments of the disclosure.

Figure 3:
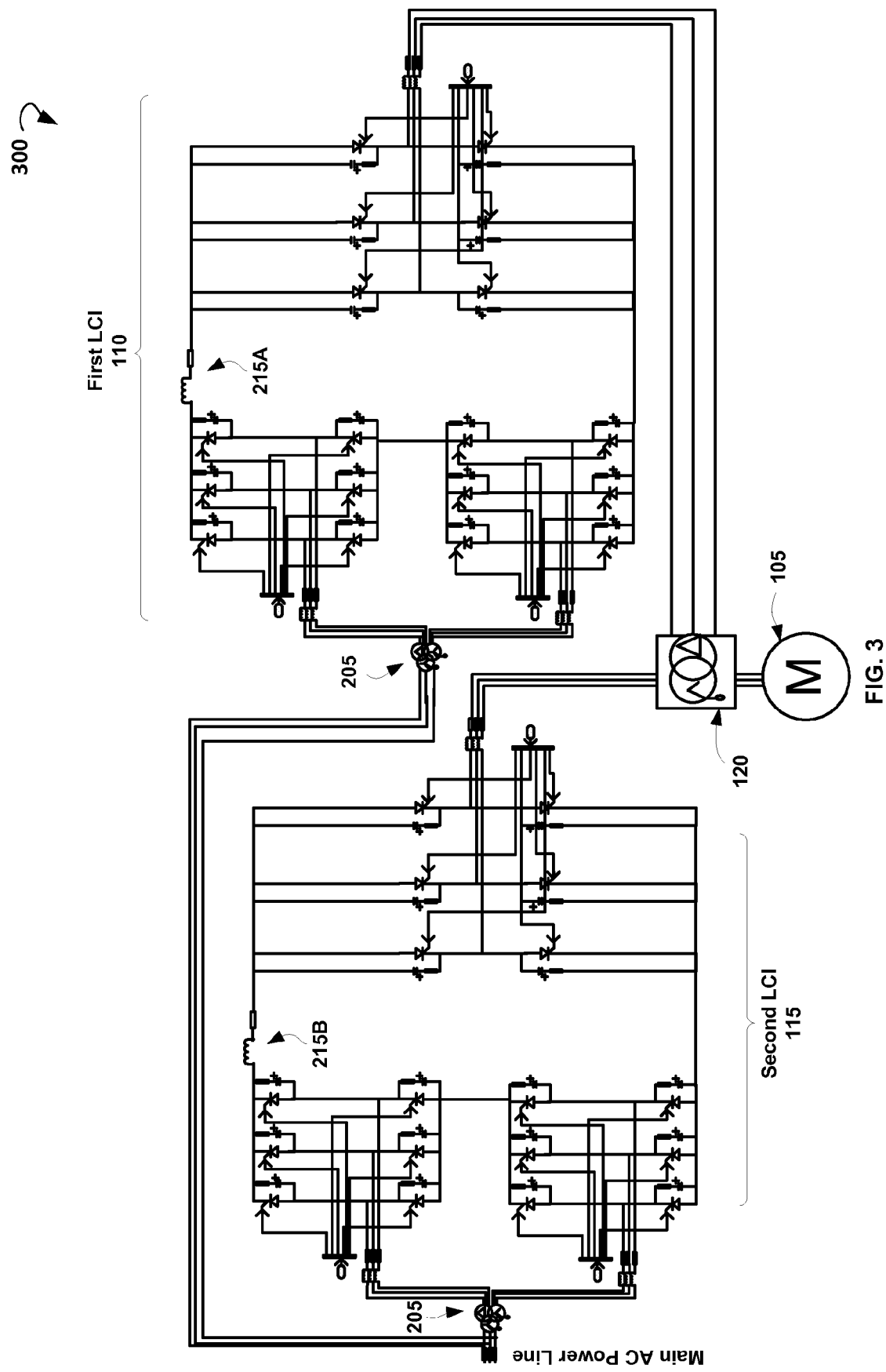

FIG. 3 shows a topology of a LCI drive system for driving a three-phase electrical synchronous machine, according example embodiments of the disclosure.

Figure 4:
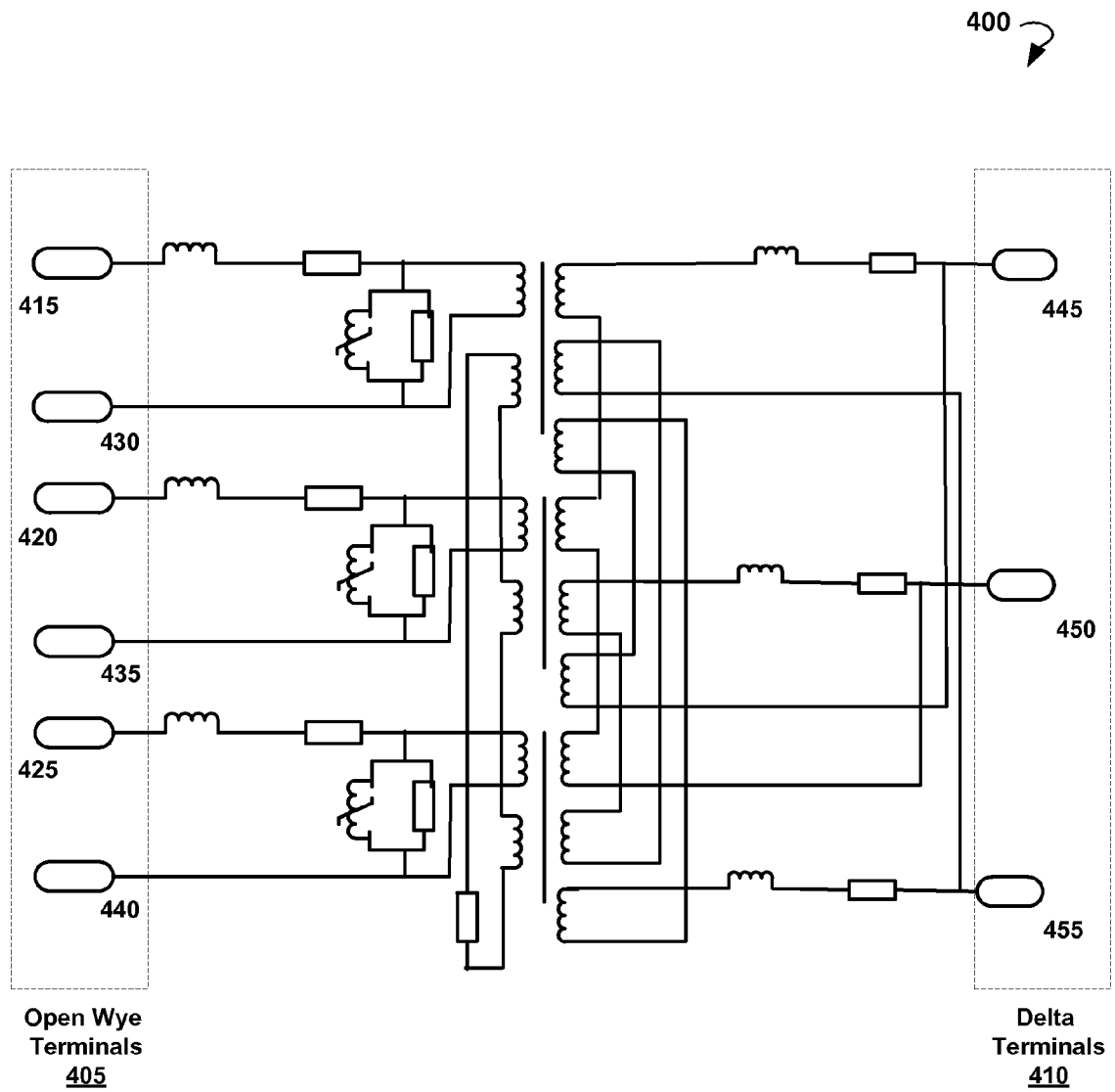

FIG. 4 shows a topology of an example open wye-delta transformer, according to example embodiments of the disclosure.

Figure 5A:
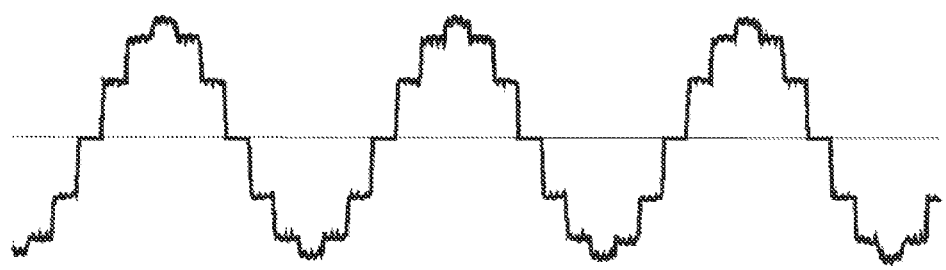
Figure 5B:
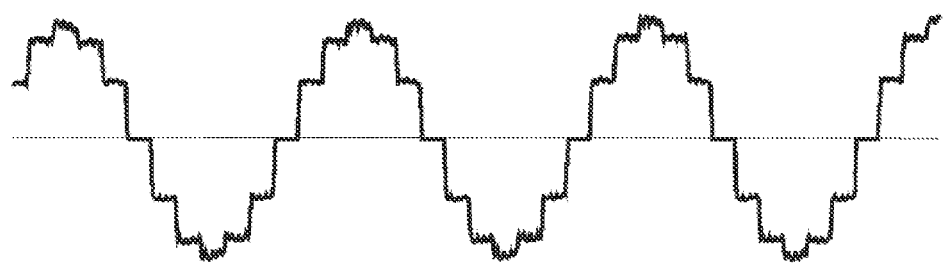
Figure 5C:
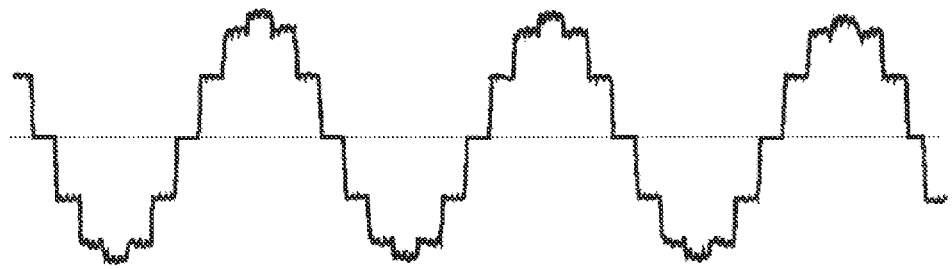

FIGS. 5A-5C show example waveforms of three phase output current for a first load side inverter operating in a self-commutated operation mode, according to example embodiments of the disclosure.

Figure 6A:
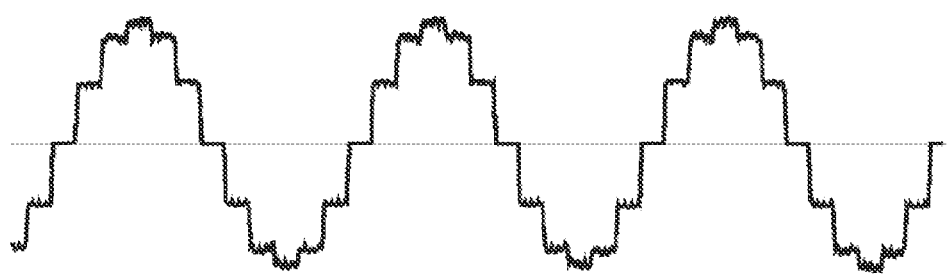
Figure 6B:
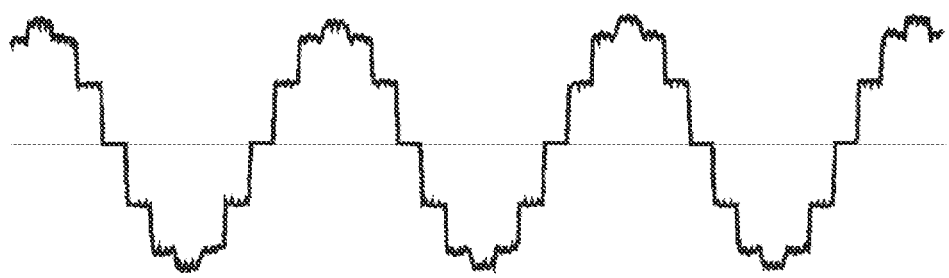
Figure 6C:
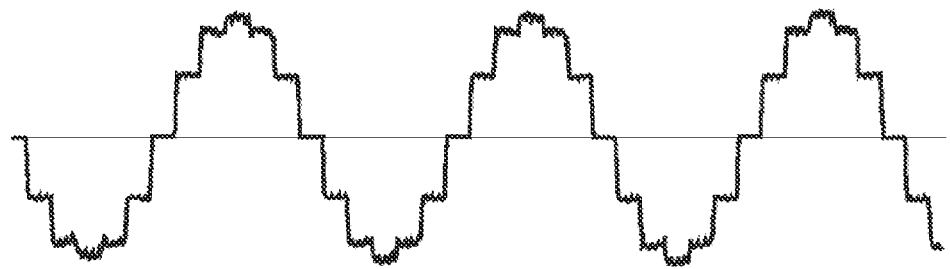

FIGS. 6A-6C show example waveforms of three phase output current for a second load side inverter operating in a self-commutated operation mode, according to example embodiments of the disclosure.

Figure 7A:
Figure 7B:
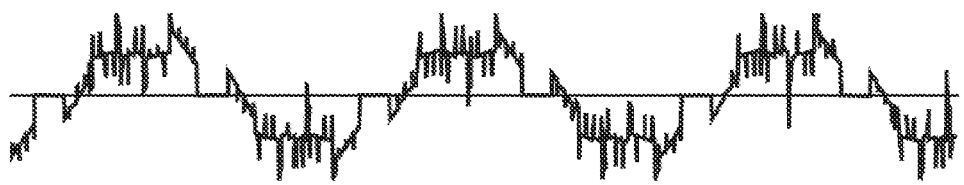
Figure 7C:

FIGS. 7A-7C show example waveforms of three phase output voltage for a first load side inverter operating in a self-commutated operation mode, according to example embodiments of the disclosure.

Figure 8A:
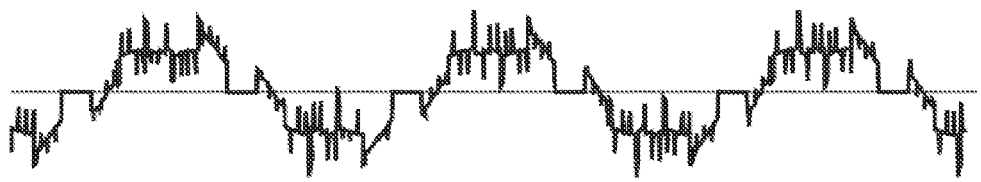
Figure 8B:
Figure 8C:

FIGS. 8A-8C show example waveforms of three phase output voltage for a second load side inverter operating in a commutated operation mode, according to example embodiments of the disclosure.

Figure 9A:
Figure 9B:
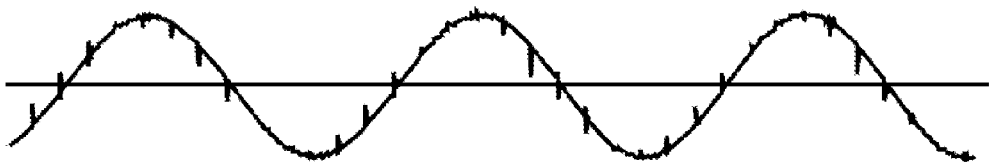
Figure 9C:

FIGS. 9A-9C show example waveforms of three phase output voltage of an open wye-delta transformer as applied to an input line for an electrical machine, according to example embodiments of the disclosure.

Figure 10:
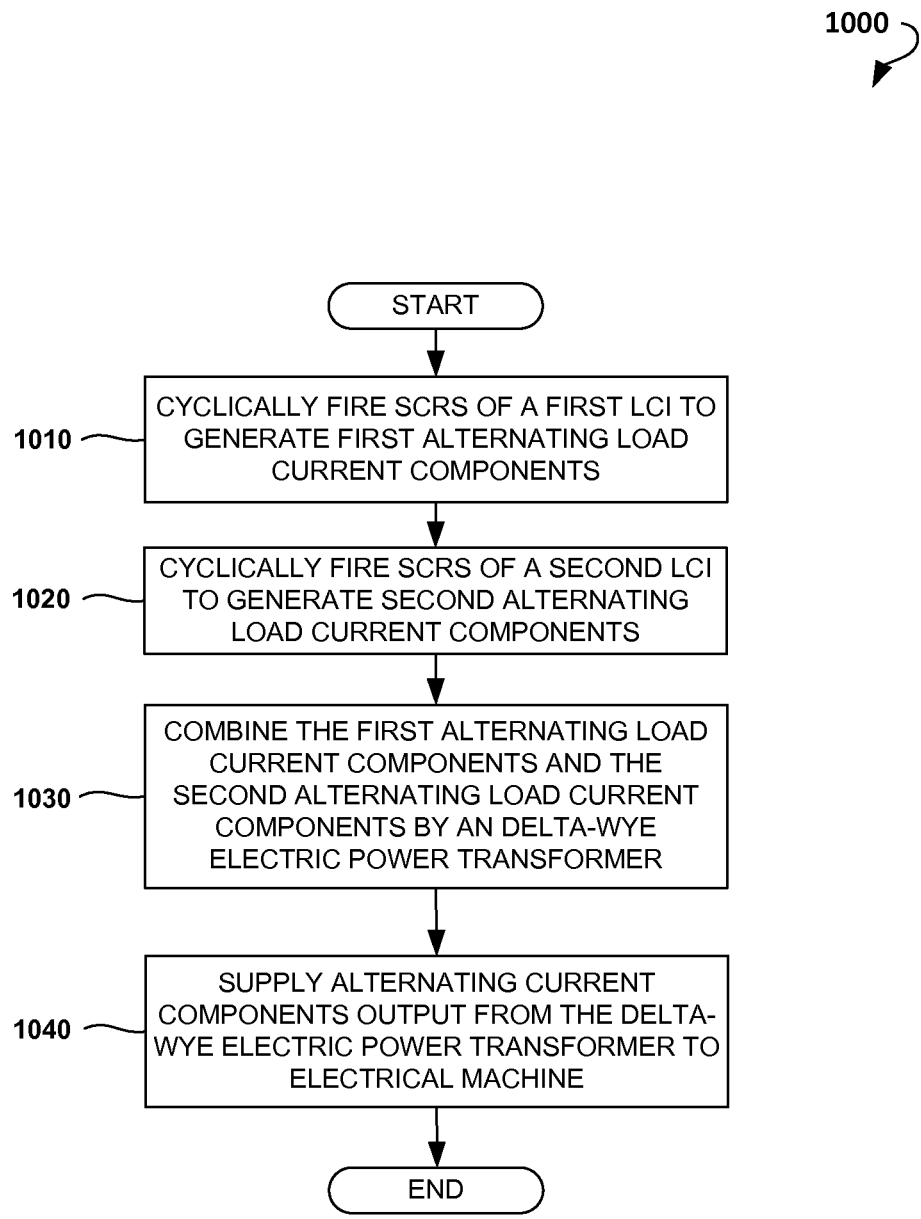

FIG. 10 shows an example flow diagram illustrating a method for powering an electrical machine, according to example embodiments of the disclosure.

DETAILED DESCRIPTION

Illustrative embodiments of the disclosure will now be described more fully hereinafter with reference to the accompanying drawings, in which some but not all embodiments of the disclosure are shown. Indeed, the disclosure may be embodied in many different forms and should not be construed as limited to the embodiments set forth herein; rather, these embodiments are provided so that this disclosure satisfies applicable legal requirements. Like numbers refer to like elements throughout.

One may appreciate that information and signals may be represented using any of a variety of different technologies and techniques. For example, data, instructions, commands, information, signals, bits, symbols, and chips that may be referenced throughout the description can be represented by voltages, currents, electromagnetic waves, magnetic fields or particles, optical fields, electron spin particles, electrospins, or any combination thereof.

The term "topology" as used herein refers to interconnections of circuit components and, unless stated otherwise, indicates nothing of a physical layout of the components or their physical locations relative to one another. Figures described or otherwise identified as showing a topology are no more than a graphical representation of the topology and do not necessarily describe anything regarding physical layout or relative locations of components.

According to one or more embodiments of the disclosure, there is provided a LCI drive system for powering an electrical synchronous machine with the LCI system integrating two series-connected low-power LCI drives to obtain a higher-power output. In some example embodiments of the disclosure, the output voltages of these two LCI drives may be combined via an open wye-delta electric power transformer, which may essentially double the output voltage of the LCIs (the machine line voltage), while the machine line current remains substantially the same as the power line current. Accordingly, in contrast to conventional systems, the disclosure may allow increasing the output voltage without having to increase voltage rating for the LCI power converters. Moreover, this technology may effectively reduce the machine line current harmonics without increasing the machine current.

The technical effects of one or more embodiments of the disclosure may include combining outputs of lower power LCIs to power higher power electrical machines. Further technical effects may optionally include decreasing input voltages needed for the operation of the electrical machine.

It should be clear that, in certain example embodiments, two series-connected LCIs may be considered a unit and a number of such units may be connected in parallel to feed an electrical machine with even higher output current and power. Furthermore, although the delta-wye electric power transformer is used for combining the outputs of the LCIs, one may appreciate that various other transformers may be used. In an example, a wye-zigzag transformer or a transformer having any combination of wye, delta or zigzag windings may be used to achieve a specific phase shift when combining the outputs of the LCIs.

FIG. 1 shows a high level block diagram of a LCI drive system 100 for driving an electrical synchronous machine 105, according to an example embodiment. In particular, the system 100 may include a first LCI 110 and a second LCI 115, which are also referred herein to as first supply bridge and second supply bridge, accordingly. The first and second LCIs 110, 115 may both have similar topology as will be discussed below, and, in general, these units include SCRs or similar thyristor based circuits to act as a diode rectifier or block input power. The first and second LCIs 110, 115 may both be connected to a main multiphase AC power line. In certain embodiments, the first and second LCIs 110, 115 may be coupled to a three-phase current input. In some further embodiments, an input transformer may be used (not shown) to input multiphase input electrical power.

The output of the first and second LCIs 110, 115 may be operatively coupled to a voltage combiner 120, which may include an open wye-delta electric power transformer, an example topology of which is presented in FIG. 4 and discussed below. The system 100 may further include a controller 125 or any other similar computational unit configured for controlling the operation of the first and second LCIs 110, 115 based on a number of parameters. In particular, the controller 125 may perform selective firing of SCRs being used in the LCIs 110, 115 based on the current operation of the electrical synchronous machine 105. In this disclosure, the electrical synchronous machine 105 refers to a three-phase electrical motor; however, one may appreciate that any other electrical machine can be used. For example, 6-phase, 9-phase, 12-phase or more phase electrical motors/generators may be used depending on an application. However, it should be clear that the topology of the system 100, number of LCIs, and type of combiner 120 may greatly depend on the type and design of the electrical synchronous machine 105 used.

FIG. 2 shows an LCI drive system 200 for driving a three-phase electrical synchronous machine 105, according to an example embodiment. As shown in this figure, the system 200 may include two supply bridges, specifically a first LCI 110 and a second LCI 115, both of which are operatively connected to the main AC power line via an optional input transformer 205. The input transformer 205 may include one or more power transformers, such as dual transformers, generating necessary phase shifts to the multiphase signal input into the supply bridges. In the example embodiment shown, the input transformer 205 includes two 3-winding wye-wye-delta transformers; however, one may appreciate that other types of delta-wye transformers, open or closed, may be used depending on a particular application.

Still referring to FIG. 2, the first LCI 110 may include a first AC-to-DC source side converter 210A, a first DC link circuit 215A, and a first DC-to-AC load side inverter 220A. Similarly, the second LCI 115 may include a second AC-to-DC source side converter 210B, a second DC link circuit 215B, and a second DC-to-AC load side inverter 220B. Further, both of the first and second AC-to-DC source side converter 210A, 210B may include two series-connected rectifier switch units 225A, 230A, 225B, and 230B, accordingly. These rectifier switch units 225A, 230A, 225B, and 230B may include a plurality of thyristor based switches, which may be instructed by the controller 125 (shown in FIG. 1) to convert the input AC signal into a corresponding DC signal.

Still referring to FIG. 2, the rectifier switch units 225A, 225B of the first and second LCIs 110, 115 may be electrically connected to the wye-windings of the input transformer 205, while the rectifier switch units 230A, 230B of the first and second LCIs 110, 115 may be electrically connected to the delta-windings of the input transformer 205. The remaining wye-windings of the input transformer may be operatively coupled to the main AC power line as shown in the figure. In certain embodiments, the use of an input wye-wye-delta transformer may help to stabilize input voltages and reduce input current harmonics. One may appreciate that other input transformers may be utilized.

As stated above, each LCI 110, 115 may have an independent DC link circuit 215A, 215B. These links may include a reactance, which may be selected to control currents flowing through the DC link circuits 215A, 215B. In particular, these DC link circuits 215A, 215B, which are also known as DC link reactors, may store a large amount of magnetic field and constitute a current source so that a continuous current flow is fed into the windings of the electrical synchronous machine 105.

The first and second DC-to-AC load side inverters 220A, 220B may be used to convert DC signals back to AC signals and, further, supply the AC signals to the windings of the electrical synchronous machine 105. These inverters 220A, 220B may also include rectifier switch units controlled by the controller 125.

As shown in FIG. 2, the first DC-to-AC load side inverter 220A may be coupled to wye windings of an output open wye-delta transformer 120, while the second DC-to-AC load side inverter 220B may be coupled to delta windings of the output open wye-delta transformer 120. Furthermore, as shown in FIG. 2, the output wye windings of transformer 120 may be operatively coupled to corresponding windings of the electrical synchronous machine 105. Provided that the electrical synchronous machine 105 includes a three-phase electrical generator or motor, the open wye-delta transformer 120 may provide an appropriate phase shift. In particular, the delta-windings may lag wye-windings by 30 degrees. In this regard, the firing angles for the second DC-to-AC load side inverter 220B may lag behind the firing angles of the first DC-to-AC load side inverter 220A by the same 30 degrees to compensate for the output transformer phase shift effect.

FIG. 3 shows a more detailed LCI drive system 300 for driving a three-phase electrical synchronous machine 105, according to another example embodiment. Similar to the LCI drive system 200 shown in FIG. 2, the LCI drive system 300 may include a first LCI 110 and a second LCI 115, both of which may be operatively coupled to the main AC power line, which is herein a utility input via an input wye-wye-delta transformer 205. Each of the first and second LCIs 110, 115 may include AC-to-DC source side converters 210A, 210B; DC link circuits 215A, 215B; and DC-to-AC load side inverters 220A, 220B. The AC-to-DC source side converters 210A, 210B and DC-to-AC load side inverters 220A, 220B may include series-connected rectifier switch units which may include a plurality of thyristors, the control inputs of which are operatively connected to the controller 125 (not shown). The controller 125 may generate firing commands to selectively open or close specific thyristors based on a controlling scheme, operating mode, and current torque parameters of the electrical synchronous machine 105 (not shown). Based on selective firing of the thyristors, a dedicated output multiphase signal may be provided to the electrical synchronous machine 105 via the output open wye-delta transformer to control its operation.

In operation, because LCIs 110, 115 are connected to the primary side and secondary side of the same transformer 120, respectively, the current in the first LCI 110 may be directly related to the current in the second LCI 115, depending on the transformer turns ratio, the delta-wye connection, and the magnetizing current.

The LCI systems 100, 200, 300 may operate in two modes to control the current: a force commutated operating mode (a static starting mode) and a self-commutated operating mode (a normal mode of operation). For the force commutated operating mode, when the load voltage is not high enough for natural commutation, the controller 125 may control the AC-to-DC source side converters 210A, 210B to periodically bring DC current output to about zero by generating specific firing commands. Moreover, since the output transformer 120 may provide, for example, a 30 degree phase shift between the LCIs 110, 115, the controller 125 may also provide a shift of 30 degrees between LCIs 110, 115 to compensate for the shift of the output transformer 120. Furthermore, during the force commutated operation mode, normally only the first LCI 110 may be fired by the controller 125, while the second LCI 115 may be shorted by providing a 0 degree firing angle to all of the switch units of the load side inverter 220B in the second LCI 115 so that the second LCI 115 acts as a diode rectifier, and provides a 90 degree firing angle for the rectifier switch units 225B, 230B so that the output DC voltage of the source side converter 210B is about zero. After the machine voltage is high enough to enter self commutated operation mode, the second load side inverter 220B may be forced to operate normally as the first load side inverter 220A. At this time, the output current of the first load side inverter 220A and second load side inverter 220B may be correlated by adjusting firings, as one may appreciate.

FIG. 4 shows an example open wye-delta transformer 120, which can be used for any LCI drive system 100, 200, 300 discussed above. As shown in FIG. 4, the transformer 120 may include a group 405 of open wye terminals 415-440 and a group 410 of delta terminals 445-455. As shown in FIG. 4, the transformer 120 may include additional and optional inductors and reactance to control and stabilize flowing currents.

According to multiple embodiments of the disclosure, the terminals 415, 420 and 425 of the wye windings may be connected to the electrical synchronous machine 105; and the terminals 430, 435 and 440 of the wye windings may be connected to the first load side inverter 220A; while the terminals 445, 450 and 455 of the delta windings may be connected to the second load side inverter 220B.

FIGS. 5-9 further illustrate operations of the open wye-delta transformer 120, according to certain embodiments of the disclosure. In particular, FIGS. 5A-5C show example waveforms 500 of three phase output current for the first load side inverter 220A operating in the self commutated operation mode. FIGS. 6A-6C show example waveforms 600 of three phase output current for the second load side inverter 220B operating in the self commutated operation mode.

FIGS. 7A-7C show example waveforms 700 of three phase output voltage for the first load side inverter 220A operating in the self-commutated operation mode. FIGS. 8A-8C show example waveforms 800 of three phase output voltage for the second load side inverter 220B operating in the self-commutated operation mode.

FIGS. 9A-9C show example waveforms 900 of three phase output voltage of the open wye-delta transformer 120 as applied to an input line for the electrical synchronous machine 105. The latter waveforms 900 may also be referred to as machine line voltage waveforms. It should also be noted that the output current harmonics may be lower than current harmonics of a conventional single LCI drive due to the transformer phase shift.

FIG. 10 shows an example flow diagram illustrating a method 1000 for powering an electrical synchronous machine 105, according to one or more embodiments of the disclosure. The method 1000 may be implemented by LCI drive systems 100, 200, 300 as described herein with reference to FIGS. 1-3.

The method 1000 may commence in operation 1010 with the controller 125 selectively and cyclically firing SCRs of the first LCI 110 to generate first AC current components. Furthermore, in operation 1020, the controller 125 may selectively and cyclically fire SCRs of the second LCI 115 to generate second AC current components. The firing may depend at least in part on current operational parameters (e.g., torque parameters) of the electrical synchronous machine 105.

In operation 1030, the voltage combiner 120, such as the open wye-delta transformer, may combine the first AC current components and the second current components into a single multiphase output signal. In operation 1040, the multiphase output signal may be supplied to the electrical synchronous machine 105.

Thus, example LCI drive systems and methods have been described. As one may appreciate, the LCI drive systems described herein may allow utilizing existing power converters to achieve relatively higher power ratings. Specifically, the voltage combiner 120 may be suitable for applications which require higher output voltage but are limited in their output current. The example LCI driver systems described herein may substantially double the output voltage while maintaining substantially the same current level as for a single LCI drive but with smaller current harmonics. In addition, the robustness of the LCI drive systems may increase because, in the case of failure with one supply bridge failing, the other supply bridge may still provide sufficient power and drive the electrical machine, thereby ensuring continuous operation of the system with minimum down time.

Although the embodiments have been described with reference to specific example embodiments, it will be evident that various modifications and changes can be made to these example embodiments without departing from the broader scope of the application. Accordingly, the specification and drawings are to be regarded in an illustrative rather than a restrictive sense.

What is claimed is:

1. A load commutated inverter (LCI) drive system for an electrical machine, the system comprising:
a first supply bridge comprising a first alternating current to direct current (AC-to-DC) source side converter, a first DC link circuit, and a first direct current to alternating current (DC-to-AC) load side inverter, wherein the first supply bridge is configured to generate a first supply of electric power;
a second supply bridge comprising a second AC-to-DC source side converter, a second DC link circuit, and a second DC-to-AC load side inverter, wherein the second supply bridge is configured to generate a second supply of electric power;
a controller configured to selectively control at least one of the first supply bridge and the second supply bridge;
an input wye-delta transformer electrically connected with the first AC-to-DC source side converter of the first supply bridge and the second AC-to-DC source side converter of the second supply bridge, wherein the first AC-to-DC source side converter is connected at a wye winding and the second AC-to-DC source side converter is connected at a delta winding of the input wye-delta transformer; and
an output delta-wye transformer electrically connected at a wye input to the first AC-to-DC source side converter and electrically connected at a delta input to the second AC-to-DC source side converter, wherein the output delta-wye transformer is configured to supply the at least one of the first supply electric power and the second supply electric power to the electrical machine.

2. The system of claim 1, wherein the input wye-delta transformer includes a first input electric power transformer configured to supply an input electric power to the first supply bridge and a second input electric power transformer configured to supply the input electric power to the second supply bridge.

3. The system of claim 2, wherein the first and the second input electric power transformers include two input 3-winding wye-wye-delta electric power transformers.

4. The system of claim 3, wherein the first AC-to-DC source side converter and the second AC-to-DC source side converter include two series-connected rectifier switch units configured to convert the input electric power.

5. The system of claim 4, wherein the two series-connected rectifier switch units comprise a first rectifier switch unit and a second rectifier switch unit, the first rectifier switch unit being coupled to the secondary wye windings of the input wye-wye-delta electric power transformer and the second rectifier switch unit being coupled to the secondary delta windings of the input wye-wye-delta electric power transformer.

6. The system of claim 1, wherein the output delta-wye transformer is an open wye-delta electric power transformer.

7. The system of claim 1, wherein the electrical machine includes a three-phase alternating current electrical machine.

8. The system of claim 1, wherein the controller is configured to selectively cause a phase shift of respective alternating currents flowing via the first DC-to-AC load side inverter and the second DC-to-AC load side inverter.

9. The system of claim 8, wherein the phase shift is 30 degrees.

10. The system of claim 1, wherein the controller is configured to periodically bring DC current output from at least one of the first AC-to-DC source side converter and the second AC-to-DC source side converter to zero during a forced commutation operation.

11. The system of claim 10, wherein the controller is configured to control operations of the first supply bridge and firings of the second supply bridge so that the second supply bridge operates as a diode rectifier during the forced commutation operation.

12. The system of claim 1, wherein the controller is configured to periodically fire silicon controlled rectifier (SCR) units of the first supply bridge and the second supply bridge based at least in part on an operation speed of the electrical machine during a self commutation operation.

13. A system for powering an electrical machine, the system comprising:
an input wye-delta electric power transformer electrically connected with a first load commutated inverter (LCI) at a wye wind in of the input wye-delta electric power transformer, and electrically connected with a second LCI at a delta winding of the input wye-delta electric power transformer,
an open wye-delta electric power transformer electrically connected, at a wye input, with a first output of the first LCI, and electrically connected, at a delta input, with the second LCI, wherein wye windings of the open wye-delta electric power transformer are operatively coupled to the electrical machine to energize the electrical machine;
the first LCI and the second LCI coupled in series between the open-wye-delta electric power transformer and a main power line, wherein the first LCI and the second LCI comprise silicon controlled rectifiers (SCRs); and
a controller configured to selectively operate the SCRs of the first LCI and the second LCI based at least in part on a current rotation speed of the electrical machine.

14. The system of claim 13, wherein the first LCI is operatively coupled to wye windings of the open wye-delta electric power transformer and the second LCI is operatively coupled to delta windings of the open wye-delta electric power transformer.

15. The system of claim 14, wherein the delta windings of the open wye-delta electric power transformer provide a phase shift of output AC components with respect to AC components provided by the wye windings of the open wye-delta electric power transformer.

16. The system of claim 15, wherein the controller is configured to selectively operate the SCRs of the first LCI and the second LCI to compensate for the phase shift of the open wye-delta electric power transformer.

17. A method for powering an electrical machine, the method comprising:
- cyclically firing silicon controlled rectifiers (SCRs) of a first load commutated inverter (LCI) to generate first alternating load current components, wherein the first LCI is electrically connected with an input wye-delta electric power transformer at a wye winding of the input wye-delta electric power transformer and electrically connected with an output wye-delta electric power transformer at a wye input of the output wye-delta electric power transformer;
- cyclically firing SCRs of a second LCI to generate second alternating load current components, wherein the first LCI is electrically connected with the input wye-delta electric power transformer at a delta winding of the input wye-delta electric power transformer and electrically connected with the output wye-delta electric power transformer at a delta input of the output wye-delta electric power transformer,
- combining the first alternating load current components and the second alternating load current components by the output delta-wye electric power transformer coupling the first LCI and the second LCI in series; and
- supplying alternating current components output from the output delta-wye electric power transformer to the electrical machine.

* * * * *

UNITED STATES PATENT AND TRADEMARK OFFICE
CERTIFICATE OF CORRECTION

Page 1 of 1

PATENT NO. : 9,065,377 B2
APPLICATION NO. : 13/838925
DATED : June 23, 2015
INVENTOR(S) : Xu et al.

It is certified that error appears in the above-identified patent and that said Letters Patent is hereby corrected as shown below:

In The Claims

In Column 8, Line 40, in Claim 13, delete "wind in" and insert -- winding --, therefor.

In Column 8, Line 43, in Claim 13, delete "transformer," and insert -- transformer; --, therefor.

In Column 8, Line 52, in Claim 13, delete "open-wye-delta" and insert -- open wye-delta --, therefor.

In Column 9, Line 23, in Claim 17, delete "transformer," and insert -- transformer; --, therefor.

Signed and Sealed this
Sixteenth Day of February, 2016

Michelle K. Lee
*Director of the United States Patent and Trademark Office*